United States Patent Office 3,573,995
Patented Apr. 6, 1971

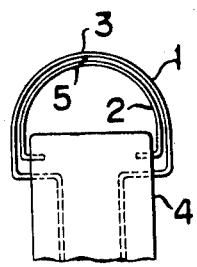
FIG. 1
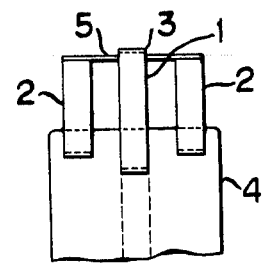
FIG. 2
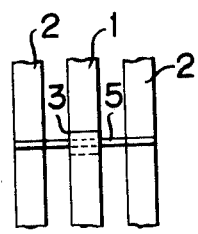
FIG. 3A
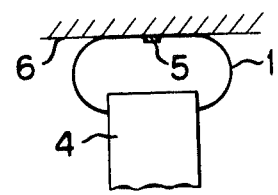
FIG. 4
FIG. 3B
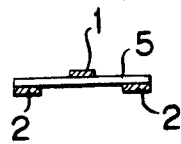
FIG. 5
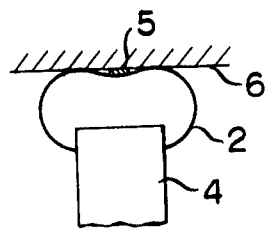

3,573,995
SURFACE CONTACTING THERMOCOUPLE
Tsuneji Senbokuyo, 23–17, Himonya 5-chome,
Meguro-ku, Tokyo, Japan
Filed Apr. 10, 1968, Ser. No. 720,149
Claims priority, application Japan, Apr. 19, 1967,
42/24,476
Int. Cl. H01v 1/02
U.S. Cl. 136—221                       6 Claims

ABSTRACT OF THE DISCLOSURE

A surface contacting thermocouple is comprised of thermocouple and a spring mechanism; the thermocouple comprises a curved outwardly projected thin band-like thermocouple wire supported by the spring mechanism, and is arranged to adhere the thermocouple closely to the surface whose temperature is to be measured.

SUMMARY OF THE INVENTION

The object of the present invention is to measure a true value or a value very close to it in a short time by providing a perfect contact between the thermocouple and the surface of the body whose temperature is to be measured; also to afford both effective reinforcement of the thermocouple and return to its original form and, at the same time, to provide a surface contacting thermocouple having durability.

The present invention will be further explained in detail with respect to each embodiment shown in the accompanying drawings in which FIG. 1 is a side view of a surface contacting thermocouple embodying the present invention;

FIG. 2 is a front view of FIG. 1;

FIG. 3A is a plan view of an enlarged essential part of the thermocouple;

FIG. 3B is a longitudinal sectional view of the enlarged essential part of the thermocouple;

FIG. 4 is a side view showing the state of contact of the thermocouple with a surface the temperature of which is to be measured;

FIG. 5 is a side view similar to FIG. 4 showing the state of contact of a spring mechanism.

In FIGS. 1 and 2, 1 denotes a band wire-like thermocouple, 2 a heat resistant auxiliary spring mechanism, 3, a joining part, and 4 a fitting implement which supports the ends of the thermocouple. The thermocouple is disposed in a curved state and projects outwardly from the fitting implement 4. The joining part 3 is located at about the middle of the thermocouple between its ends. The heat resistant auxiliary spring mechanisms 2, 2 are elastically supported, one on each side of the thermocouple, and each spring mechanism consists of a heat resistant spring band wire, both ends of which are fixed to the fitting implement 4 like the thermocouple 1. A support piece 5 is fixed to and extends between the spring band wires of the spring mechanism 2, 2.

A thin material is used for the thermocouple 1, for instance, the material is 0.05–0.1 mm. thick and 1–1.5 mm. wide and material about 0.05–0.1 mm. thick and 1–1.5 mm. wide is employed for the band wires of the spring mechanism 2, 2 to provide a suitable spring force according to the size of the thermocouple 1. A fine wire, for instance, a stainless steel wire of 0.15 mm. dia. or a thin band wire, for instance, a stainless band steel wire of about 0.05 mm. thick and 0.3 mm. wide is used for the support piece 5. At its ends the support piece 5 is secured at or close to the middle of each spring mechanism. The support piece can be welded to the upper surface or lower surface of the spring mechanisms 2, 2 or it may be attached to the spring mechanism by a punching operation. Further, as shown in FIG. 3, the support piece 5 is fixedly spanned across the upper surfaces of the spring mechanisms 2, 2 and contacts the lower surface of the joining part 3 of the thermocouple 1 in a state of free contact or it can be secured by means of spot welding, etc.

Thus, when the thermocouple 1 makes contact with the surface 6 whose temperature is to be measured, as shown in FIGS. 4 and 5, the thermocouple 1 and the auxiliary spring mechanism parts 2, 2 closely adhere to the surface 6, but is obtained by closely adhering only a length of the thermocouple of about 10 mm. centering around the joining part 3.

Further, in the previous case, the temperature at the contact portion of the joining part 3 of the thermocouple 1 is the same as that of the contact portion of the spring mechanism parts 2, 2 and therefore heat movement from the joining part 3 of the thermocouple through the support piece 5 does not occur. Contact of the thermocouple 1 and the surface 6 becomes perfect due to the spring mechanisms 2, 2 and, therefore, the joining part 3 receives heat properly from the surface 6 and acquires the same temperature or a temperature very close to it. Further, the spring mechanisms 2, 2 assure the return of the thermocouple to its original form and moreover, prevents any deformation due to a user's carelessness.

What is claimed is:

1. A thermocouple for measuring the temperature of a surface by placing a portion of the thermocouple in contact with the surface comprising a support fitting, a wirelike thermocouple member having its ends secured to said support fitting and the portion between its ends forming a loop extending outwardly from said support element with at least the outermost part of the loop having an elastically deformable curved configuration arranged to contact the surface to be measured, a spring support device secured to said support fitting and comprising a pair of band wire spring members each disposed on an opposite side of said thermocouple member and secured at their ends to said support fitting, said spring members extending outwardly from said support fitting and having an elastically deformable loop configuration similar to that of said thermocouple member, said spring members disposed in spaced parallel relationship with said thermocouple member and each of said thermocouple member and said spring members having an inner surface facing toward said support fitting and an oppositely directed outer surface arranged to face toward the surface to be measured, and a support piece extending transversely of said thermocouple member and said spring members and disposed in supporting contact with the inner surface of said thermocouple member at approximately the midpoint between its ends opposite the outer surface of said thermocouple member arranged to be placed in contact with the surface to be measured, said support piece secured at its ends to the outer surfaces of said spring members and arranged to contact the surface to be measured when said thermocouple member is in contact with the surface to be measured.

2. A thermocouple as set forth in claim 1, wherein the outer surface of said thermocouple member, arranged to contact the surface which is to be measured, is located a greater distance from said support fitting than the similarly directed surface of said spring members when said thermocouple member and spring members are not in contacting engagement with the surface to be measured.

3. A thermocouple as set forth in claim 1, wherein said thermocouple member is formed of a thin material having a thickness of about 0.05–0.1 mm. and a width of about 1.0–1.5 mm.

4. A thermocouple as set forth in claim 1, wherein said spring members are formed of a thin heat resistant material having a thickness of about 0.05–0.1 mm. and a width of about 1.0–1.5 mm.

5. A thermocouple as set forth in claim 1, wherein said support piece is formed of stainless steel wire having a diameter of about 0.15 mm.

6. A thermocouple as set forth in claim 1, wherein said support piece is formed of a stainless steel band-shaped wire having a thickness of about 0.05 mm. and a width of about 0.3 mm.

References Cited

UNITED STATES PATENTS

| | | | |
|---|---|---|---|
| 1,883,444 | 10/1932 | Albert | 136—221 |
| 2,022,515 | 11/1935 | Orchard | 136—221X |
| 2,422,124 | 6/1947 | Obermaier | 136—221 |
| 2,991,654 | 7/1961 | Engelhard | 136—230X |
| 3,283,580 | 11/1966 | Nanigian et al. | 136—230X |
| 3,395,050 | 7/1968 | Senbokuya | 136—221 |
| 3,468,723 | 9/1969 | Lambert | 136—221 |

LELAND A. SEBASTIAN, Primary Examiner

H. E. BEHREND, Assistant Examiner

U.S. Cl. X.R.

136—225, 230